(12) United States Patent
Pust et al.

(10) Patent No.: US 8,617,402 B2
(45) Date of Patent: Dec. 31, 2013

(54) METHOD OF RAISING THE PH OF ACIDIC BODIES OF WATER

(75) Inventors: Christopher Pust, Düsseldorf (DE); Günter Scholz, Hoyerswerda (DE); Helma Honig, Wülfrath (DE); Wolfgang König, Wülfrath (DE)

(73) Assignee: Rheinkalk GmbH, Wulfrath (DE)

(*) Notice: Subject to any disclaimer, the term of this patent is extended or adjusted under 35 U.S.C. 154(b) by 857 days.

(21) Appl. No.: 12/677,451

(22) PCT Filed: Sep. 15, 2008

(86) PCT No.: PCT/EP2008/062264
§ 371 (c)(1),
(2), (4) Date: Jun. 21, 2010

(87) PCT Pub. No.: WO2009/037232
PCT Pub. Date: Mar. 26, 2009

(65) Prior Publication Data
US 2010/0282688 A1 Nov. 11, 2010

(30) Foreign Application Priority Data

Sep. 13, 2007 (DE) .......................... 10 2007 043 751
Nov. 27, 2007 (DE) .......................... 10 2007 057 414

(51) Int. Cl.
*C02F 1/66* (2006.01)
*E21C 41/32* (2006.01)

(52) U.S. Cl.
USPC ........ 210/746; 210/742; 210/743; 210/747.1; 210/747.5; 210/747.7; 210/747.8; 210/752; 210/724

(58) Field of Classification Search
USPC ........... 210/746, 747.7, 747.8, 752, 742, 743, 210/747.1, 747.5, 170.01, 170.1, 170.11, 210/170.02, 170.09
See application file for complete search history.

(56) References Cited

U.S. PATENT DOCUMENTS

| 1,575,134 A | 3/1926 | Stocking |
| 2006/0144798 A1 | 7/2006 | Dixon et al. |

FOREIGN PATENT DOCUMENTS

| DE | 28 51 872 | 11/1980 |
| DE | 41 24 073 | 1/1992 |

(Continued)

OTHER PUBLICATIONS

A.J. Geldenhuys, J.P. Maree, M. De Beer, and P. Hlabela: "An integrated limestone/lime process for partial sulphate removal" The Journal of the South African Institute of Mining and Metallurgy, 2003, pp. 345-354.

(Continued)

*Primary Examiner* — Duane Smith
*Assistant Examiner* — Paul J Durand
(74) *Attorney, Agent, or Firm* — Honigman Miller Schwartz and Cohn LLP; Thomas A. Wootton; Jonathan P. O'Brien

(57) ABSTRACT

The invention relates to a method of raising the pH of a body of water having a pH of less than 4.5 by introducing neutralizing agent, the raising of the pH taking place in at least two stages thus: at pH levels below 4.5, a first neutralizing agent having a final conductivity of not more than 100 µS/cm, and, after attainment of a pH of at least 4.5, a second neutralizing agent, having a final conductivity of more than 100 µS/cm, is introduced into the body of water, the final conductivity of the neutralizing agents being defined as the conductivity of an aqueous suspension or solution of neutralizing agent in solution equilibrium at 25° C., having a neutralizing agent content of 0.015% by weight.

20 Claims, 2 Drawing Sheets

1 - lime milk 1
2 - lime milk 2
3 - lime hydrate
4 - lime milk dolomite lime 1
5 - dolomite lime hydrate 1
6.1 - dolomite lime hydrate 2a
6.2 - dolomite lime hydrate 2b
6.3 - dolomite lime hydrate 2 ground
7 - ash
8 - half-burnt dolomite
9 - dolomite rock meal
10 - dolomite lime 2
11 - chalk
12 - powdered limestone

(56) References Cited

FOREIGN PATENT DOCUMENTS

| | | |
|---|---|---|
| DE | 42 33 526 | 4/1994 |
| DE | 199 61 243 | 7/2001 |
| DE | 203 01 323 | 5/2003 |
| DE | 20 2004 002 159 | 7/2004 |
| DE | 103 04 009 | 8/2004 |
| DE | 10 2004 032 404 | 1/2006 |
| DE | 102 27 951 | 6/2007 |
| DE | 10 2006 001920 | 7/2007 |
| DE | 20 2008 008 390 | 2/2009 |
| DE | 10 2007 057 414 | 6/2009 |
| DE | 10 2008 024 989 | 11/2009 |
| DE | 10 2008 024 990 | 11/2009 |
| DE | 10 2008 029 643 | 12/2009 |
| DE | 10 2008 039 988 | 3/2010 |
| GB | 191111131 | 6/1911 |
| JP | 60 182968 | 9/1985 |
| WO | 99/39773 | 8/1999 |
| WO | 02/16272 A | 2/2002 |
| WO | 2009/037194 | 3/2009 |

OTHER PUBLICATIONS

International Search Report dated Dec. 16, 2008.

------- 1 - lime milk 1
·········· 2 - lime milk 2
——————— 3 - lime hydrate
——————— 4 - lime milk dolomite lime 1
—··—··—·· 5 - dolomite lime hydrate 1
—··—··—·· 6.1 - dolomite lime hydrate 2a
——————— 6.2 - dolomite lime hydrate 2b
—··—··—·· 6.3 - dolomite lime hydrate 2 ground
·········· 7 - ash
——————— 8 - half-burnt dolomite
—·—·—·—· 9 - dolomite rock meal
——————— 10 - dolomite lime 2
——————— 11 - chalk
·········· 12 - powdered limestone

METHOD OF RAISING THE PH OF ACIDIC BODIES OF WATER

The invention relates to a method for raising the pH of acidic bodies of water by introducing neutralising agent. In particular, the invention relates to a method for raising the pH of residual open-pit mining lakes with a water volume of more than 500,000 m$^3$.

Regions in which open mining has been carried out, are often affected for decades after mining activity has ceased by its consequences. After eliminating the general groundwater reduction, the reappearing groundwater flows through the dumps left behind by the mining. In particular due to the pyrite weathering in open mining, these dumps are often enriched with a high acid potential. This leads to the acidification of residual open-pit mining lakes being produced, which as a consequence often have pH values of less than 3. Even residual mining lakes which have already been flooded and were originally neutral or have already been neutralised can acidify if groundwater flows in from acidic dumps.

By flooding with surface water, the acidification can basically be counteracted, as the latter has a certain neutralisation potential. At high degrees of acid or with flooding from residual mining lakes partially already filled with acidic groundwater, the small neutralising potential of surface water is, however, not sufficient for neutralisation. As a result, the lakes remain in their acidic state.

It is known to neutralise acidic water at points, for example at the exit from a lake, by liming. The liming is generally carried out here in pit water purification plants (PWPs). The lake itself, however, likewise remains in its acidic state and is therefore unusable economically and from the point of view of tourism.

Moreover, so-called in-lake methods are known, such as are described, for example, in DE 199 612 43. In these methods, power station ashes, which originate from the combustion of brown coal, are re-suspended in order to neutralise the acid capacity present in the lake. This method is, however, only usable if old ashes are present in the body of water. Moreover, the activity of the ashes used and the flow through them are comparatively small.

DE 103 04 009 describes a method for controlling the water quality of open acidic bodies of water, in which, using in-lake method, injector and mixing technology as well as fine-particle neutralising agents and a considered distribution technology, a high degree of efficiency of the neutralising agent used is achieved. With a good mixing of the neutralising agent and a good distribution in the lake alone, the degrees of efficiency in the material conversion cannot be optimised, however.

DE 41 24 073 A1 and WO 02/016272 A1 also describe methods for treating acidic bodies of water. The application of the methods described there in large quantities of water, as often occur in residual mining lakes, requires a disproportionately high technical or economical outlay, however.

A method for improving the water quality of acidic bodies of water is known from DE 10 2006 001 920 A1. In this method, in a first treatment stage, at a low pH, a calcium- or calcium-/magnesium-containing feed material is introduced, and in a second stage at a higher pH, sodium hydroxide solution is introduced. In this method, high product feed costs are overall necessary.

The present invention was based on the object of providing a method for raising the pH of bodies of water with a pH of less than 4.5, in which neutralising agents are used, the base capacity of which is optimally utilised. In this manner, the costs of treating the body of water are minimised.

This object is achieved according to the invention by a method for raising the pH of a body of water with a pH of less than 4.5 by introducing neutralising agent, in which the raising of the pH takes place in at least two stages in such a way that at pH values of less than 4.5, a first neutralising agent with a final conductivity of at most 100 µS/cm and, after reaching a pH of at least 4.5, a second neutralising agent with a final conductivity of more than 100 µS/cm is introduced into the body of water, the final conductivity of the neutralising agent being determined as the conductivity of an aqueous neutralising agent suspension or solution in solution equilibrium at 25° C. with a neutralising agent content of 0.015% by weight.

Figure 1:
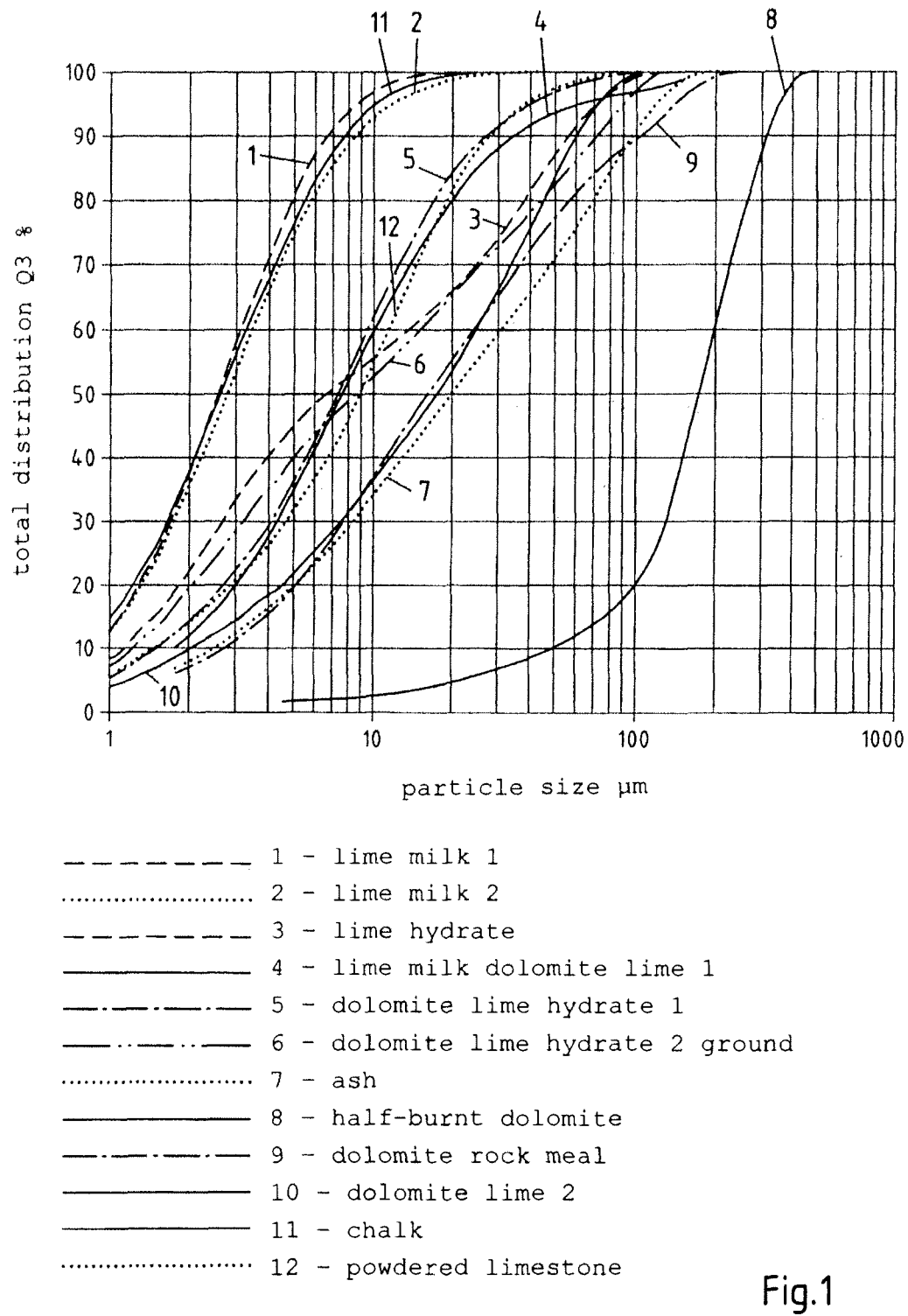
FIG. 1 shows the total distribution Q3% is shown in FIG. 1 as a function of the particle size.

The method according to the invention is distinguished in that the neutralising agents used are selected and introduced as a function of the respective actual state of the pH of the acidic body of water to be treated. In particular, at pH values of below 4.5, neutralising agents with a final conductivity of at most 100 µS/cm are used, preferably of at most 70 µS/cm, still more preferably of at most 40 µS/cm and in particular of at most 20 µS/cm, while at pH values of at least 4.5, neutralising agents with a final conductivity of more than 100 µS/cm, preferably of more than 200 µS/cm, still more preferably of more than 300 µS/cm, and in particular of more than 500 µS/cm are used.

The term neutralising agent is taken, according to the invention to mean a chemical compound, which has a specific basicity and is in a position to raise the pH of an acidic body of water.

The term final conductivity of the neutralising agent is taken, according to the invention, to mean the conductivity of an aqueous neutralising agent suspension or solution at 25° C. with a neutralising agent content of 0.015% by weight, which is in solution equilibrium.

If a chemical compound is placed in the water, as a function of factors such as solution enthalpy, particle size, temperature etc, a defined fraction of the compound goes into solution. As a result, the conductivity of the solution is increased. After a certain time, a solution equilibrium is adjusted. This equilibrium is characterised in that per time unit, the same particle number goes into solution as is precipitated from the solution. If the solution equilibrium has been established, no further increase in the conductivity of the solution investigated takes place. According to the invention, the final conductivity is reached if the conductivity does not change by more than 10 µS/cm in one minute. The conductivity achieved in the state of equilibrium therefore represents the final conductivity according to the invention of the solution under consideration in the conditions selected.

To define the final conductivity according to the invention, the following conditions were selected. The starting point is to be neutralising agent suspensions with a mass concentration of 1 g solid in 100 ml sample volume. From these suspensions, 1.5 ml is placed in deionised water (100 ml) with the temperature controlled at 25° C. and the adjustment of the solution equilibrium is awaited. The suspensions contained here have a neutralising agent content of 0.015% by weight. The suspension constituents may be stirred to accelerate the adjustment of the equilibrium. The solution equilibrium is characterised in that the measured conductivity does not change by more than 10 µS/cm in one minute. The conductivity measured at this instant under the conditions given above, represents the final conductivity of the neutralising agent, as it is to be understood according to the invention.

It was surprisingly found that neutralising agents with low final conductivities at low pH values achieve significantly higher effects than at high pH values. In particular it was found that neutralising agents with a final conductivity of at most 100 µS/cm at pH values of below 4.5 have a significantly higher degree of efficiency than at higher pH values. This fact is used by the method according to the invention in that it consists of at least two stages, with neutralising agents with comparatively low final conductivities being used in the first stage at low pH values. This procedure is advantageous as neutralising agents with low final conductivities are generally more economical than neutralising agents with higher final conductivities. Only at pH values of at least 4.5, in which the reactivity of the neutralising agents with low final conductivities decreases are the more expensive neutralising agents with higher final conductivities used.

According to the invention the fact is therefore utilised that until a pH of 4.5 is reached, economical neutralising agents are used, which have a surprisingly high degree of efficiency at these pH values. On the other hand, more expensive neutralising agents with a higher activity are only used at higher pH values. Overall, the method according to the invention thus proves to be effective and nevertheless cost-efficient.

The method according to the invention is particularly economical when treating acidic bodies of water with a high water volume, such as, for example a water volume of more than 500,000 m$^3$, as large quantities of neutralising agent are used here.

The pH of the body of water to be treated can be raised to various values by the method according to the invention. However, the pH is preferably raised to a value of at least 5, in particular of at least 6.

The method according to the invention may also be carried out by the addition of the neutralising agent to the body of water as a whole (in-lake method) or else at points, for example at the exit of the lake. However, implementation as an in-lake method is particularly suitable, as the effectiveness and cost efficiency of the method according to the invention is utilised particularly well in this manner.

The neutralising agent may be introduced in the most varied manners into the body of water. Excellent results are achieved if the neutralising agent is introduced in the form of a suspension, in particular an aqueous suspension, into the body of water.

Practical series of tests were carried out, in which the degree of efficiency of the neutralising agents used was investigated in suspensions of different concentration while varying the pH. It was surprisingly found here that at pH values of more than 4.5, the degree of efficiency of the neutralising agents drops, if the suspension contains more than 2% by weight of neutralising agent. This drop in the degree of efficiency is connected with an increase in the product feed quantity and therefore with rising costs.

For this reason, it is particularly preferred according to the invention if the raising of the pH takes place in such a way that the neutralising agent is introduced at pH values of below 4.5 in the form of a suspension with a concentration of 2 to 15% by weight, preferably from 5 to 10% by weight, of neutralising agent and at pH values of at least 4.5 in the form of a suspension with a concentration of 0.05 to 2% by weight, preferably from 0.1 to 1% by weight, of neutralising agent. In this embodiment, the neutralising potential present of the neutralising agent used is optimally utilised as a function of the actual state of the pH of the body of water to be treated. This leads to a further increase in the efficiency of the method according to the invention.

At a pH of below 4.5, the most varied materials can be used according to the invention as the neutralising agents as long as these materials are alkaline and have a final conductivity of at most 100 µS/cm. According to the invention, materials originating from lime are preferably used, specifically, in particular, chalk, lime, limestone slurry, carbokalk, half-burnt dolomite, dolomite grit and/or dolomite rock meal. These materials are preferred according to the invention as they are particularly economical.

At a pH of at least 4.5, the most varied materials can also be used according to the invention as neutralising agents as long as they are alkaline and have a final conductivity of at least 100 µS/cm. According to the invention materials originating from lime are preferably used, specifically, in particular, burnt lime, lime hydrate, slaked burnt lime, dolomite grit, dolomite burnt lime and/or dolomite lime hydrate. These materials are preferred at pH values of at least 4.5 as they have high activity.

Apart from the final conductivity, the solution affinity of the neutralising agent used also plays an important part. It is particularly advantageous if, at low pH values, neutralising agents with a low solution affinity are used. These neutralising agents are generally more economical than those with a high solution affinity. Thus, this embodiment is particularly cost-efficient. At higher pH values, it is advantageous, on the other hand, to use neutralising agents with higher solution affinities. The dissolution speed of alkaline compounds namely generally decreases with an increasing pH. Thus, when using neutralising agents which originally have a small solution affinity, there is a risk at higher pH values of these sinking to the bottom of the body of water without having completely reacted and thus being removed from the neutralising process.

Practical tests have shown that the method according to the invention is particularly effective if at a pH of the body of water of below 4.5, neutralising agents are used, which have a solution affinity, measured as a sulphuric acid consumption in a pH stationary titration of 0.5 g neutralising agent in 100 ml deionised water at 20° C., by means of 0.5 mol/l sulphuric acid at a pH of 6 and for a period of 30 minutes, of less than 6.5 ml, preferably of less than 5 ml, and in particular of less than 2 ml.

pH stationary titration is a standard method for determining the neutralisation kinetics of alkaline substances. The substance, the solution affinity of which is to be determined, is prepared at room temperature as a suspension while stirring. An acid is now added drop-wise to this suspension at a speed such that the pH adjusts stationarily to a predetermined pH. After identical time periods, in each case, compounds with a higher solution affinity have a higher acid consumption than those with a lower solution affinity. This is to be attributed to the fact that in compounds with a higher solution affinity per time unit, a larger quantity of base goes into solution and is available there for neutralising the acid added drop-wise.

The solution affinity, as it is to be understood in the sense of the method according to the invention, relates to the consumption in ml of 0.5 mol/l sulphuric acid, which can be introduced into a suspension of 0.5 g neutralising agent in 100 ml deionised water in a 250 ml beaker (wide) within 30 minutes, without the pH of the suspension falling below 6, while the suspension is stirred at 20° (±2° C.) with a magnetic stirrer and a magnetic stir bar of about 30 mm in length and about 7 mm in diameter at a speed of 800 rpm. According to the preferred embodiment of the invention mentioned above, at pH values of the body of water of less than 4.5, neutralising agents are preferably used of the type where the solution affinity, measured as the sulphuric acid consumption by the method described above, is less than 6.5 ml, preferably less than 5 ml and, in particular, less than 2 ml.

At pH values of the body of water of at least 4.5, on the other hand, neutralising agents are preferably used of the type where the solution affinity, measured as the sulphuric acid consumption by the method described above, is at least 6.5 ml, preferably more than 8 ml and, in particular, more than 10 ml.

According to a further preferred embodiment of the invention, at pH values of the body of water of less than 4.5, materials originating from lime with a particle size distribution D50 of more than 7.4 μm, preferably more than 9, and in particular more than 11 μm are used as the neutralising agent. Materials originating from lime with a particle size distribution of this type are characterised in that half of the particles contained in them have a diameter of less than 7.4. Because of the larger surface, materials with a smaller D50 value have a higher reaction capacity and therefore a higher solution affinity than materials of the same type, which have a higher D50 value.

Materials originating from lime with a particles size distribution D50 of less than 7.4 μm, preferably of less than 5 μm and, in particular, of less than 3 μm, are accordingly particularly suitable neutralising agents according to the invention at pH values of the body of water of at least 4.5.

The invention will be described in more detail below with the aid of three embodiments.

Table 1 show the analyses of the neutralising agents used in the embodiments.

TABLE 1

|  | Lime hydrate | Dolomite lime 1 | Dolomite lime hydrate 1 | Lime milk 1 (20%) | Lime milk 2 (45%) | Dolomite lime hydrate 2 | Ash | Half-burnt dolomite | Dolomite rock meal | Dolomite lime 2 | Chalk | Powdered limestone |
|---|---|---|---|---|---|---|---|---|---|---|---|---|
| CaO | 72.8 | 53.09 | 45.01 | 73.5 | 72.9 | 42.66 | 49.57 | 38.87 | 29.75 | 60.00 | 50.43 | 54.69 |
| MgO | 0.74 | 38.92 | 31.81 | 0.6 | 0.6 | 30.68 | 1.91 | 26.08 | 21.5 | 32.74 | 0.45 | 0.50 |
| $SiO_2$ | 3.30 | 1.78 | 1.65 | 0.4 |  | 7.17 | 10.6 | 0.08 | 0.77 | 2.97 | 6.36 | 0.85 |
| $SO_3$ | 0.16 | 0.17 | 0.37 | 0.2 |  | 0.12 | 25.65 | 0.01 | 0.03 | 0.53 | 0.09 | 0.047 |
| $Fe_2O_3$ | 0.33 | 0.82 | 0.93 | 0.1 |  | 3.42 | 4.00 | 0.28 | 0.2 | 0.89 | 0.39 | 0.11 |
| $Al_2O_3$ | 0.25 | 0.70 | 0.78 | 0.1 |  | 2.8 | 4.95 | 0.05 | 0.30 | 0.94 | 1.36 | 0.21 |
| $Mn_2O_3$ | 0.03 | 0.14 | 0.21 |  |  | 0.24 | 0.06 | 0.11 | 0.06 | 0.03 | 0.04 | 0.04 |
| $K_2O$ | 0.08 | 0.06 | 0.02 |  |  | 0.62 | 0.15 | 0.01 | 0.02 | 0.12 | 0.21 | 0.06 |
| Cl | n.k. | 0.06 | 0.08 |  |  | 0.02 | 0.07 | 0.02 | 0.01 | 0.05 | 0.00 | n.k. |
| $CO_2$ | 2.36 | 3.98 | 1.47 |  |  | 3.27 | n.k. | 33.72 | n.k. | 0.78 | 40.08 (calculated) | 43.48 (calculated) |
| GLV | 22.11 | 4.24 | 19.04 | 24.8 | 25.3 | 12.27 | 3.02 | 34.38 | 47.16 | 1.70 | 40.53 | n.k. |
| Total | 99.8 | 99.98 | 99.90 | 74.9 | 73.5 | 100.00 | 99.98 | 99.89 | 99.86 | 100.00 | 99.86 | 99.99 |

Table 2 shows the particle size distribution of the neutralising agents used in the embodiments

TABLE 2

| Particle size in μm | D10% | D50% | D90% | D97% | D100% | Sv m2/cm3 |
|---|---|---|---|---|---|---|
| Lime milk 1 (20%) | 0.9 | 2.6 | 6.7 | 9.9 | 21.0 | 3.1 |
| Lime milk 2 (45%) | 0.9 | 2.8 | 8.5 | 14.6 | 51.0 | 2.9 |
| Lime hydrate | 1.1 | 6.7 | 56.6 | 82.5 | 123.0 | 1.9 |
| Lime milk dolomite lime 1 (30%) | 1.8 | 7.6 | 34.5 | 102.1 | 206.0 | 1.3 |
| Dolomite lime hydrate 1 | 1.5 | 7.4 | 27.5 | 51.5 | 103.0 | 1.6 |
| Dolomite lime hydrate 2 ground | 1.2 | 8.5 | 72.2 | 98.9 | 147.0 | 1.7 |
| Ash | 2.5 | 20.3 | 97.7 | 135.1 | 206.0 | 0.9 |
| Half-burnt dolomite | 47.5 | 174.2 | 314.3 | 379.9 | 515.0 | 0.1 |
| Dolomite rock meal | 2.7 | 16.2 | 102.1 | 163.9 | 246.0 | 0.9 |
| Dolomite lime 2 | 2.1 | 17.4 | 60.6 | 80.5 | 103.0 | 1.1 |
| Chalk | 0.8 | 2.6 | 7.6 | 12.1 | 30.0 | 3.1 |
| Powdered limestone | 1.5 | 8.9 | 28.4 | 47.8 | 103.0 | 1.5 |

The total distribution Q3% is shown in FIG. 1 as a function of the particle size.

EXAMPLE 1

Determination of the Conductivity of Lime Milk and Lime Hydrate

1. Purpose and Application Area

The method is used to determine the conductivity of alkaline compounds such as lime milk and lime hydrate. It is used, in particular, to determine the final conductivity and the reactivity (dissolution speed) of lime milk products such as lime hydrates.

2. Basis of the Method

The reactivity of lime milk and lime hydrate may expediently be defined by the dissolution speed thereof in water. This is accessible by conductometric methods. The reactivity test described below is based on the change rapidly taking place in the conductivity after metering a lime milk or a lime hydrate suspension as a result of the increase in the ion concentration, caused by the dissolution of calcium hydroxide. As a result, the final conductivities according to the invention of alkaline substances such as lime milk and lime hydrate are obtained as well as times, by which characteristic fractions of the solid have gone into solution.

3. Equipment 3.1 Conductometer with rigidly adjustable measuring range (for example 0-2 ms/cm)

3.2 Conductivity measuring cell with non-sheathed and non-platinised Pt-electrodes.

The pre-treatment of the electrode should be carried out in accordance with the specifications of the equipment producer.

3.3 Computer with suitable software for data collection.

3.4 150 ml measuring vessel with thermostat casing and with a covering, which is provided with openings for the measuring cell, the propeller stirrer, the gas feed, the gas outlet and the sample feed.

3.5 Thermostat.

3.6 Propeller stirrer or suitable magnetic stirrer.

3.7 Pipette (1.5 ml) with metering device.

4. Reagents 4.1 Potassium chloride solution, c(KCl)=0.01 mol/l.

4.2 Potassium chloride solution, ω(KCl)=3%.

4.3 Water, deionised, $CO_2$-free.

4.4 Nitrogen, $N_2$.

5. Measuring Method 5.1 Measuring process 5.1.1 Preparation of the Apparatus

As the freely rinsable, but not sheathed plate electrodes change their characteristics after repeated use, at the beginning of each measuring series, the cell constant of the electrode should be determined with potassium chloride solution (4.1). The electrode should be placed in the measuring vessel in such a way that the electrode faces are parallel to the movement direction of the water.

As the dissolution speed of rapidly soluble lime milks or lime hydrates depends on various factors, such as the stirrer type, stirrer speed, vessel dimensions and position of the measuring cell and metering location, it is sensible to define the measuring apparatus by means of measuring performance data (homogenisation time).

5.1.2 Determination of the Homogenisation Time 100 ml water (4.3) are prepared in the sample vessel and the temperature is controlled to 25° C. The vessel is rinsed with nitrogen during the measurement in order to prevent a retrospective take up of $CO_2$. With the stirrer running, which should run at as high a speed as possible, but without too strong a vortex formation, and after the starting of the recording of the measured value, 1.5 ml KCl solution (4.2) is metered with the pipette (3.7) into the prepared water.

5.1.3 Determination of the Dissolution Speed

At the beginning, with lime milk samples, the dry substance should be determined, as, for the measurement, the suspension is adjusted with a mass concentration of 1 g solid in 100 ml sample volume. To produce this suspension, a volume equivalent to this solid content of the lime milk is removed and filled to 100 ml. A suspension is also produced from lime hydrates with a mass concentration of 1 g/100 ml. The samples are left to rest for about 30 minutes (complete wetting of the hydrate surface). 1.5 ml of the sample are metered as fast as possible into the water (4.3) (100 ml) with the temperature controlled to 25° C. in the sample vessel.

5.2 Evaluation 5.2.1 Establishing the Starting Point t=0 and Defining the Final Conductivity The measured conductivity change is recorded as a function of the time. The curve obtained here has to be recorded until the maximum conductivity is reached. For highly reactive finely dispersed lime milk, a recording of the measured value over two minutes is generally sufficient, a value being recorded every 0.1 s. The starting time (t=0) is established for the first measured value, at which the conductivity changes by more than 20 μS/(cm−0.1 s).

The final conductivity $ae_{max}$ is reached when the conductivity changes by no more than 10 μS/cm in one minute. $ae_{max}$ is calculated as the average from the measured values from reaching the final conductivity over a time interval of 1 min.

The homogenisation time (final conductivity $ae_{max}$ of the KCl solution (4.2)) should be <2.5 s.

5.2.2 Reading Off the Dissolving Times and Information on the Results

To measure the lime samples, the dissolving times are given in seconds for which 63, 80, 90 and 95% of the maximum conductivity are reached. The conductivities ae (x %) are calculated according to the following equation.

$$ae(x\%) = ae_{max}/100$$

The corresponding dissolving times t (x %) are read off from the conductivity time curves.

6. Annex

Measuring devices other than those described under section 3 can also be used. It is must be ensured here that the homogenisation time established in section 5.2.1 is adhered to. To determine the homogenisation time, the metering volume has to be selected such that the final conductivity reaches (900±50) μS/cm. This metering volume has to be retained to measure the samples.

EXAMPLE 2

Determining the Final Conductivities of the Neutralising Agents Investigated

In order to determine the final conductivities of the neutralising agents investigated, the process is as described under Example 1.

Figure 2:
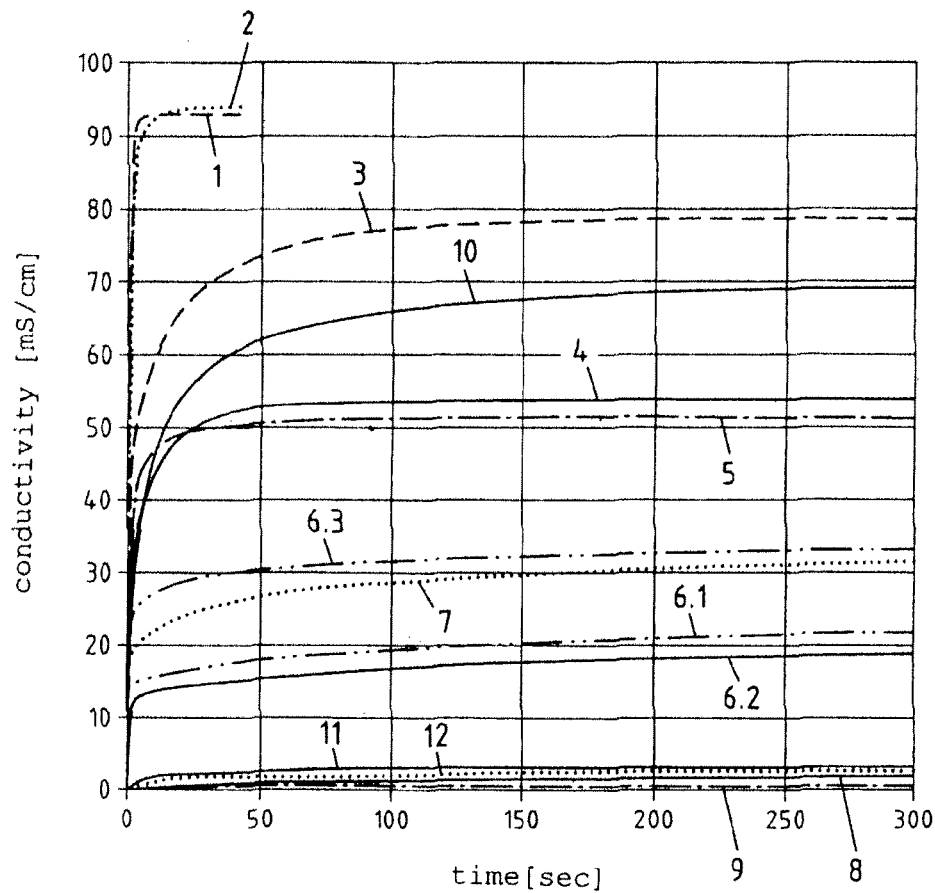
FIG. 2 shows the change in conductivities of the neutralizing agent solutions against time.

The results are shown in FIG. 2 and Table 3. It is shown that the conductivities of the neutralising agent solutions investigated firstly increase sharply and then tangentially approach a final conductivity value. The neutralising agents limestone meal, half-burnt dolomite, dolomite rock meal and chalk have final conductivities of below 100 μS/cm.

TABLE 3

| Conversion after s | LM 1 20% | LM 2 45% | LH | LM DML 1 30% | DMLH 1 | DMLH 2a | DMLH 2b | DMLH 2 ground | Ash | Half-burnt dolomite | DMRM | DML 2 | Chalk | PL |
|---|---|---|---|---|---|---|---|---|---|---|---|---|---|---|
| 63% | 0.8 | 0.9 | 3.0 | 2.9 | 1.7 | 2.9 | 0.5 | 1.5 | 7.2 | n.k. | n.k. | 9.0 | n.k. | n.k. |
| 80% | 1.1 | 1.5 | 14.1 | 9.4 | 3.6 | 70.8 | 71.2 | 17.5 | 50.4 | n.k. | n.k. | 27.9 | n.k. | n.k. |
| 90% | 1.5 | 2.7 | 34.6 | 19.3 | 7.9 | 208.5 | 191.9 | 121.4 | 160.1 | n.k. | n.k. | 74.0 | n.k. | n.k. |
| 95% | 1.9 | 4.5 | 59.7 | 32.1 | 16.9 | 418.9 | 330.5 | 403.8 | 352.8 | n.k. | n.k. | 172.2 | n.k. | n.k. |
| 100% | 7.8 | 38.0 | 285.1 | 392.8 | 116.1 | 1189.4 | 1085.0 | 1198.2 | 1149.9 | >1800 | >1800 | 1781.0 | n.k. | n.k. |
| Final guide value [μS/cm] | 928 | 939 | 787 | 540 | 512 | 234 | 202 | 356 | 335 | 54 | 10 | 717 | 32 | 32 |

EXAMPLE 3

Determination of the Solution Affinity of the Neutralising Agent by pH Stationary Titration In Example 3, the neutralising kinetics of the different neutralising agents is determined in the acidic range by pH value stationary titration with sulphuric acid at a pH of 6. 0.5 g of the respective neutralising agent are prepared in 100 ml deionised water in a 250 ml beaker (wide) at 25° C. with stirring with a magnetic stirrer and a magnetic stir bar of 30 mm in length and about/mm in diameter at a stirring speed of 800 rpm and 0.5 molar sulphuric acid added dropwise at a speed such that the pH is stationarily adjusted to 6. The quantity of sulphuric acid, which can be added within 30 minutes without a pH of 6 being fallen below is established and supplies a measure of the solution affinity of the neutralising agents investigated in the acidic medium.

The theoretical consumption of sulphuric acid for the reaction:

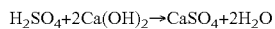

$$H_2SO_4 + 2Ca(OH)_2 \rightarrow CaSO_4 + 2H_2O$$

is 13.7 ml.

Table 4 shows the consumption of sulphuric acid in ml after 30 minutes for the neutralising agents used. It is shown that the various products have a different sulphuric acid consumption. Neutralising agents with a high reactivity lead to an overall higher sulphuric acid consumption than products with lower reactivity.

TABLE 4

| | Product | pH starting value | Consumption $H_2SO_4$ in ml after 30 min |
|---|---|---|---|
| 1 | Lime milk 1 (20%) | 12.6 | 13.7 |
| 2 | Lime milk 2 (45%) | 12.5 | 13.6 |
| 3 | Lime hydrate | 12.6 | 12.2 |
| 4 | Lime milk dolomite lime 1 (30%) | 12.6 | 14.0 |
| 5 | Dolomite lime hydrate 1 | 12.6 | 13.5 |
| 6 | Dolomite lime hydrate 2a | 12.3 | 6.8 |
| 7 | Dolomite lime hydrate 2b | 12.3 | 6.5 |
| 8 | Dolomite lime hydrate 2 ground | 12.3 | 9.1 |
| 9 | Ash | 12.3 | 4.5 |
| 10 | NaOH 50% | 13.0 | 12.7 |
| 11 | Half-burnt dolomite | 11.0 | 2.1 |
| 12 | Dolomite rock meal | 9.6 | 0.7 |
| 13 | Dolomite lime | 12.2 | 8.3 |
| 14 | Chalk | 9.9 | 7.6 |
| 15 | Powdered limestone | 9.8 | 4.3 |

The invention claimed is:

1. A method for raising the pH of a body of water wherein said body of water has a pH of less than 4.5;
   said method comprises: using at least one neutralizing agent and raising the pH in at least two stages;
   when said body of water has a pH of less than 4.5, a first neutralizing agent with a final conductivity of, at most, 100 μS/cm, is added to said body of water, and
   after reaching a pH of at least 4.5, a second neutralizing agent in the form of materials originating from lime, with a final conductivity of more than 100 μS/cm is introduced into the body of water, the final conductivity of the neutralizing agents being determined as the conductivity of an aqueous neutralizing agent suspension or solution in solution equilibrium at 25° C. with a neutralizing agent content of 0.015% by weight and the neutralizing agent being introduced at pH values of less than 4.5 in the form of a suspension at a concentration of 2.0 to 15% by weight, and at pH values of at least 4.5 being introduced in the form of a suspension having a concentration of 0.05 to 2% by weight, into the body of water.

2. A method of claim 1, wherein the pH of the body of water having a volume of more than 500,000 m3 is raised.

3. A method of claim 2, wherein the pH of said body of water is raised to a value of at least 5.

4. A method of claim 3, wherein the pH of said body of water is raised to a value of at least 6.

5. A method of claim 1 wherein said body of water is a lake.

6. A method of claim 1 wherein said neutralizing agent is in the form of a suspension.

7. A method of claim 1 wherein said materials originating from lime, are selected from any single, or any combination of materials comprising: chalk, lime, limestone slurry, carbokalk, half-burnt dolomite, and dolomite rock meal, with a final conductivity of, at most, 100 μS/cm.

8. A method of claim 1, wherein said neutralizing agent is selected from any single, or any combination of materials comprising: burnt lime, lime hydrate, slaked burnt lime, dolomite burnt lime and/or dolomite lime hydrate, with a final conductivity of, more than, 100 μS/cm.

9. A method of claim 1, wherein; when said body of water has a pH of less than 4.5 then said first neutralizing agent is used with a solution affinity, measured as the sulphuric acid consumption in a pH stationary titration of 0.5 g neutralizing agent in 100 ml deionized water at 20° C., by means of 0.5 mol/l sulphuric acid at a pH of 6 and for a period of 30 minutes, of less than 6.5 ml.

10. A method according to claim 9, wherein said first neutralizing agent is used with a solution affinity, of less than 5.0 ml.

11. A method according to claim 10, wherein said first neutralizing agent is used with a solution affinity, of less than 2.0 ml.

12. A method according to claim 1, when said body of water, after reaching a pH of at least 4.5, then said second neutralizing agent is used with a solution affinity, measured as the sulphuric acid consumption in a pH stationary titration of 0.5 g neutralizing agent in 100 ml deionized water at 20° C., by means of 0.5 mol/l sulphuric acid at a pH of 6 and for a period of 30 minutes, of more than 6.5 ml.

13. A method according to claim 12, wherein said second neutralizing agent is used with a solution affinity, of more than 8.0 ml.

14. A method according to claim 13; wherein said second neutralizing agent is used with a solution affinity, of more than 10.0 ml.

15. A method according to claim 1, wherein said body of water has a pH of less than 4.5 then said first neutralizing agent is selected from materials originating from lime, with a particle size distribution D50 of at least 7.4 μm.

16. A method of claim 15, wherein, said first neutralizing agent is selected from materials originating from lime, with a particle size distribution D50 of more than 9 μm.

17. A method of claim 16, wherein, said first neutralizing agent is selected from materials originating from lime with a particle size distribution D50 of more than 11 μm.

18. A method of claim 15, when said body of water, after reaching a pH of at least 4.5, then said second neutralizing agent is selected from materials originating from lime, and having a particle size distribution D50 of less than 7.4 μm.

19. A method of claim 18 herein, said second neutralizing agent is of materials, originating from lime and having a particle size distribution D50 of less than 5 μm.

20. A method of claim 19 wherein, said second neutralizing agent is of materials, originating from lime and having a particle size distribution D50 of less than 3 μm.

\* \* \* \* \*